(No Model.) 13 Sheets—Sheet 1.

G. SEBOLD.
MOLDING MACHINE.

No. 284,494. Patented Sept. 4, 1883.

Fig. 1.

Witnesses:
Harry Drury
Hubert Howson

Inventor:
Georg Sebold
by his Attorneys
Howson & Sons (No Model.)  
13 Sheets—Sheet 2.

G. SEBOLD.
MOLDING MACHINE.

No. 284,494. Patented Sept. 4, 1883.

Fig. 2.

Witnesses:
Harry Drury
David Williams

Inventor:
Georg Sebold
by his Attorneys
Howson & Son (No Model.) 13 Sheets—Sheet 5.

G. SEBOLD.
MOLDING MACHINE.

No. 284,494. Patented Sept. 4, 1883.

Witnesses:
Harry Drury
David Williams

Inventor:
Georg Sebold
by his Attys.
Howsm & Sons (No Model.)

G. SEBOLD.
MOLDING MACHINE.

No. 284,494.

Patented Sept. 4, 1883.

Witnesses:
Harry Drury
David Williams

Inventor:
Georg Sebold
by his Attorneys
Howson & Sons

(No Model.)  13 Sheets—Sheet 7.

G. SEBOLD.
MOLDING MACHINE.

No. 284,494.  Patented Sept. 4, 1883.

Witnesses:
Harry Drury
David Williams

Inventor:
Georg Sebold
by his Attorneys,
Howson & Son (No Model.)
13 Sheets—Sheet 8.

G. SEBOLD.
MOLDING MACHINE.

No. 284,494. Patented Sept. 4, 1883.

Witnesses:
Harry Drury
David Williams

Inventor:
Georg Sebold
by his Attorneys:
Howson & Son (No Model.)  
13 Sheets—Sheet 10.

G. SEBOLD.
MOLDING MACHINE.

No. 284,494. Patented Sept. 4, 1883.

Witnesses:
Harry Drury
David Williams

Inventor:
Georg Sebold
by his Attorneys
Howson & Sons

UNITED STATES PATENT OFFICE.

GEORG SEBOLD, OF CARLSRUHE, GERMANY.

MOLDING-MACHINE.

SPECIFICATION forming part of Letters Patent No. 284,494, dated September 4, 1883.

Application filed May 25, 1882. (No model.) Patented in Belgium February 21, 1882, No. 57,130; in England February 21, 1882, No. 855; in Germany February 23, 1882; in France February 25, 1882, No. 147,567; in Austria-Hungary April 19, 1882, No. 14,580 and No. 6,319, and in Italy June 30, 1882, XXVIII, 293, and XVI, 14,067.

*To all whom it may concern:*

Be it known that I, GEORG SEBOLD, a resident of Carlsruhe, Germany, and a subject of the Emperor of Germany, have invented certain Improvements in Molding-Machines, (for which I have obtained patents in Belgium, February 21, 1882, No. 57,130; in Great Britain, February 21, 1882, No. 855; in France, February 25, 1882, No. 147,567; in Germany, February 23, 1882; in Italy, June 30, 1882, No. XXVIII, 293, and XVI, 14,067, and in Austria-Hungary, April 19, 1882, Nos. 14,580 and 6,319,) of which the following is a description.

My invention relates to machines for preparing sand-molds for casting, in which manual labor in the pressing of the sand in the mold and in the manipulation and fitting together of the parts of the mold or flasks is dispensed with, as far as possible, and the work done by machinery.

My invention consists of improvements in the construction of such machinery, as more fully described hereinafter.

In the accompanying drawings.

Figure 1:
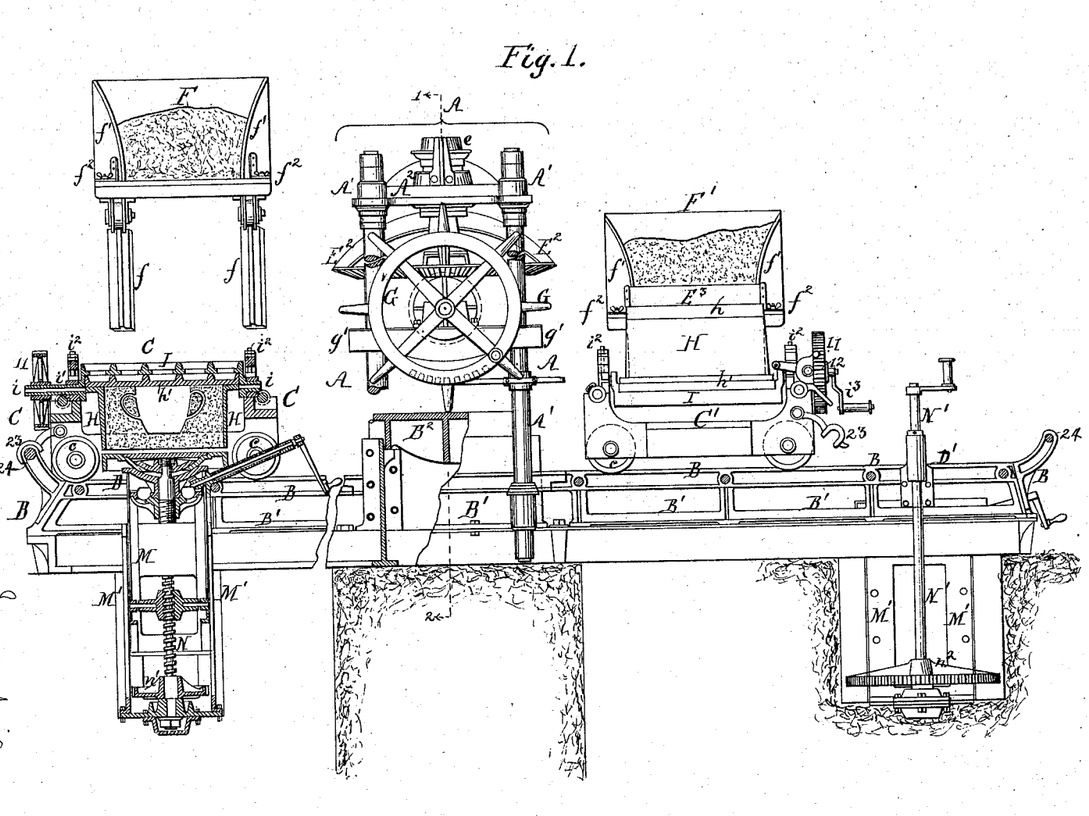
Figure 1 is a side view, partly in section, of the complete molding-machine, but without the flask-fitting device.
Figure 2:
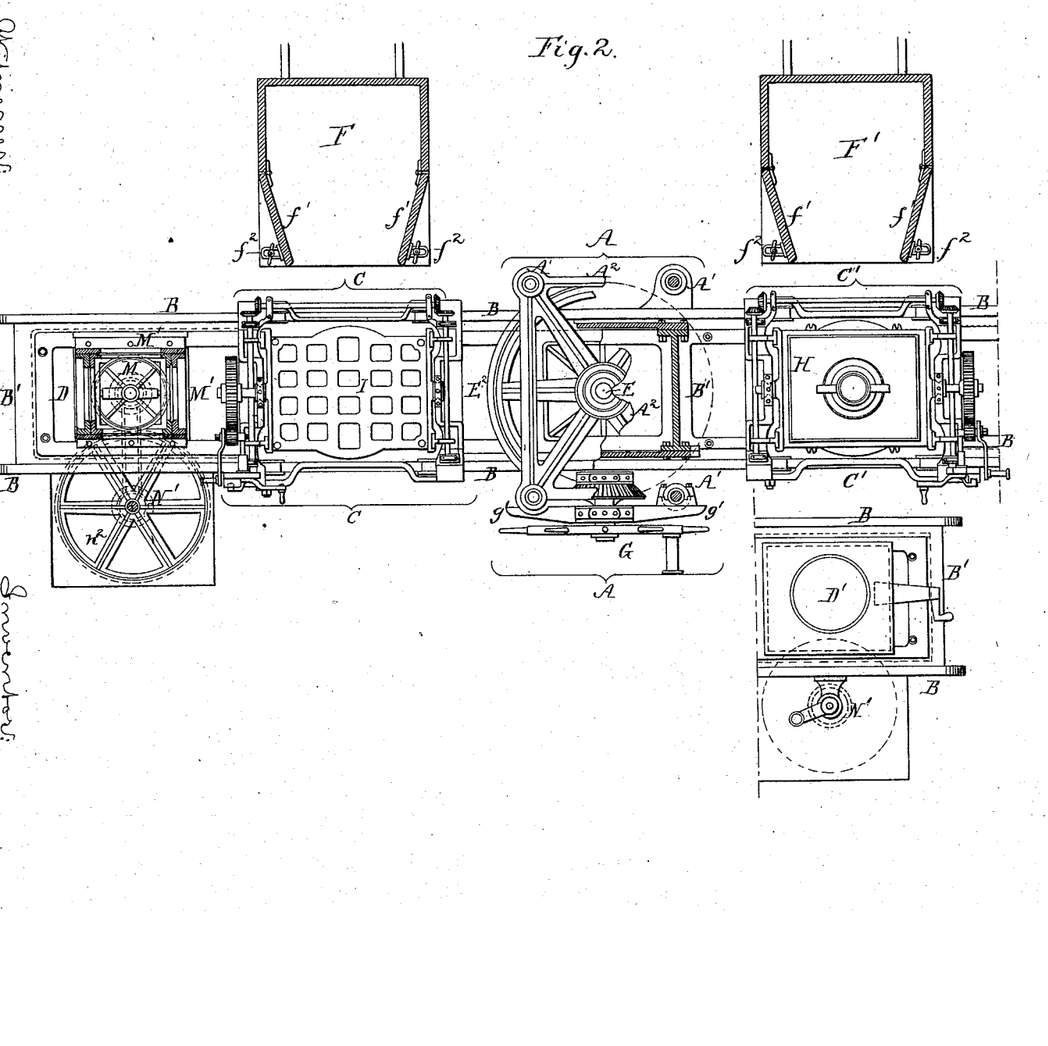
Fig. 2 is a plan view of the same, also partly in section, one end of the apparatus in this view being shown as cut off and placed, for want of space, below the view of the main portion.

The molding apparatus consists, principally, as shown in Figs. 1 and 2, of a press, A, mounted on standards on a suitable foundation, rails or tracks B B, mounted on the same foundation, and extending through the press-frame to some distance on each side thereof, two traveling carriages C, C', (one for carrying each half of the mold,) mounted to travel on said tracks, and a device, D D', at each end of the tracks for receiving the half-mold from its traveling carriage C, (C'.) In addition, there is mounted on suitable transverse ways at the side of the tracks, above the level of the mold-box as it rests on the carriage, a sand-supply box or hopper, F, (F',) for each mold, about midway between the central press, A, and the receiver D (D') at the corresponding end of the tracks.

In Fig. 1 the track at the left-hand side of the press is shown as broken away, and that end of the track with the carriage C and receiver D brought close to the press; but this is only for the purpose of bringing the illustration within the compass of the drawing-sheet.

In the plan view, Fig. 2, the proper relation of the receiver D (shown in section) to the central press is correctly illustrated, and the carriage C is shown as being without any mold-box and opposite the sand-hopper F, while the carriage C' is illustrated as provided with its mold-box and its patterns, ready to receive sand from the hopper F', and the receiving-table D' is, for want of space on the drawing-sheet, shown cut off and in another position.

The principal steps in the operation of this apparatus are as follows: After the half-mold boxes have been secured, with their patterns, to the beds of their carriages C C', fine molding-sand is sprinkled over the patterns, and then the boxes are filled with ordinary molding-sand from the hoppers F F', after the pressframes have been put on the tops of the boxes. Then one of the carriages—say C—is run beneath the platen of the press A, when a press-block is placed on the top of the sand, and the latter is then properly pressed into the mold-box by the press, and when the platen is raised again this carriage C, with its pressed mold, is run out from beneath the press to a position over the receiving-table D. Then while this is being done, and the press-frame and block are being removed, and the bed of the carriage C is being reversed, and the pressed mold deposited on the table D, Fig. 1, the carriage C', with the other box filled with sand, is run from the other side under the press A and the sand properly compressed therein to form the mold in the same way. Then this carriage C' is run out to a position over its receiving-table D' and the bed of the carriage reversed to deposit the box on the table D', which is elevated for the purpose, as was also the table D. Then the two tables D D', with the boxes thereon, are lowered out of the way of the carriages, and the beds of the latter are reversed to receive new boxes and patterns, Fig. 2. When the patterns have been withdrawn from the pressed half-molds, the latter are transferred to the fitting device, which, as we have seen, is separately illustrated in Figs. 18, 19, and 20.

Having thus described the main features of the machine and the principal steps in its use, I will now proceed to describe in detail the several parts separately in the following order: the sand-hoppers F F', the press A, the traveling carriage C, (or C',) the receiving-table D, (or D',) and the fitting device.

Figure 3:
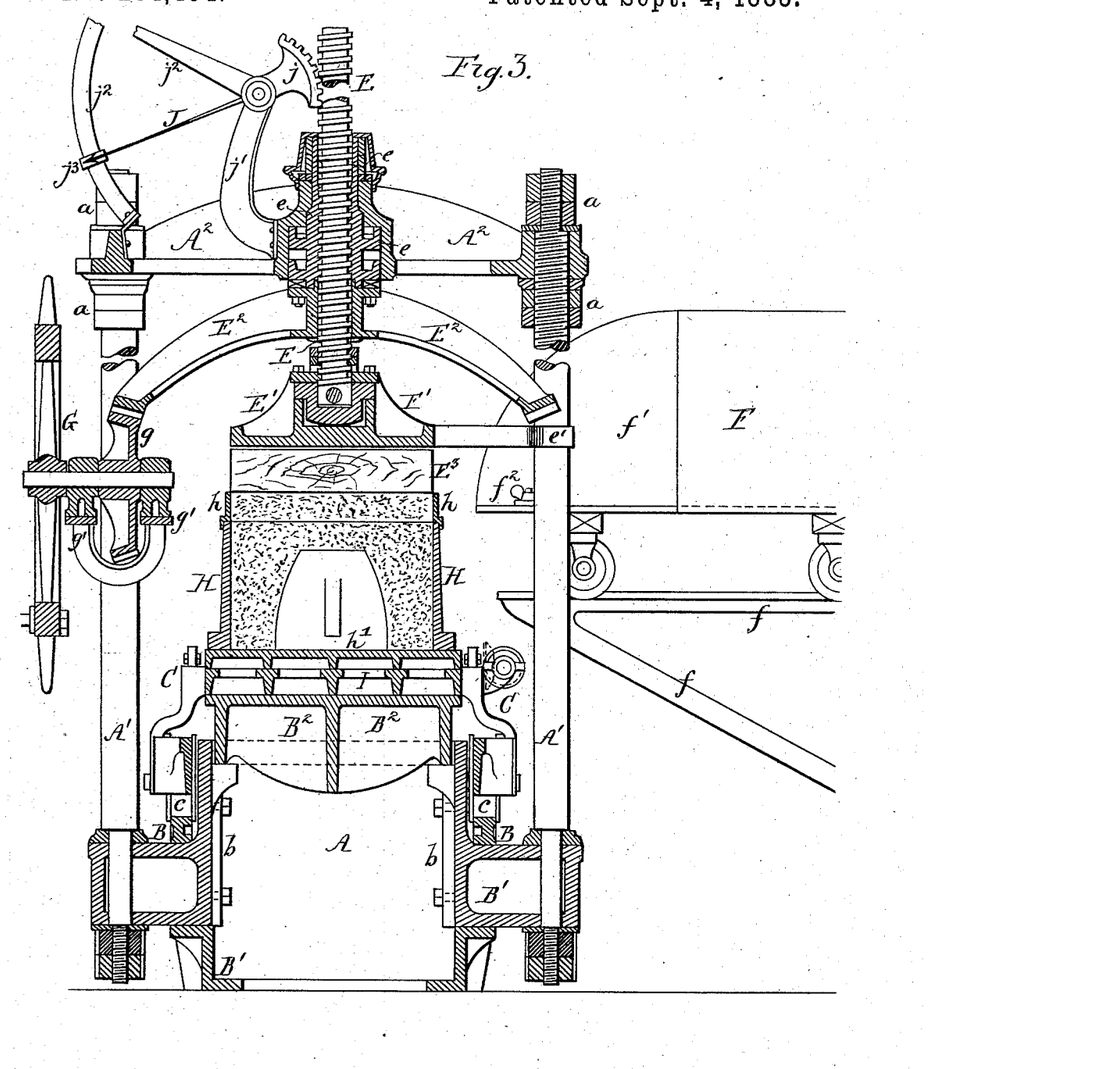
Fig. 3 is a vertical section on the line 1 2, Fig. 1, of the mold-press, drawn to a larger scale.

*The sand-hoppers.*—The sand hoppers or boxes F F' are mounted on wheels adapted to travel on rail-brackets $f$ $f$, Figs. 1 and 3, so that these hoppers may be moved toward or from the mold-boxes on the carriages C C' when the latter are brought opposite them to receive the sand, as indicated at the right-hand side of Fig. 1. These brackets $f$ $f$ may be arranged at any suitable height, the two pairs of brackets being shown at different heights in Fig. 1. The front of each hopper adjacent to the mold-boxes is open, and the sides at this front edge are provided with hinged wings $f'$ $f'$, Figs. 1, 2, and 3, so that the width of the opening for the delivery of the sand may be adjusted to correspond with the size of the mold-box. The wings $f'$ are secured, after adjustment, by means of screws and thumb-nuts $f^2$, in connection with slotted lugs on the wings, or by means of any other suitable device.

Figure 5:
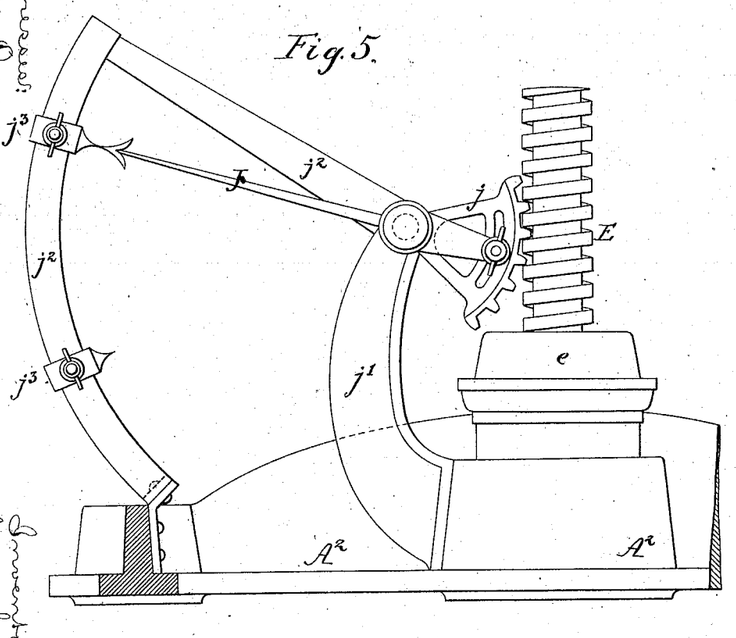
Fig. 5 is a detached side view, partly in section, of the indicator.
Figure 6:
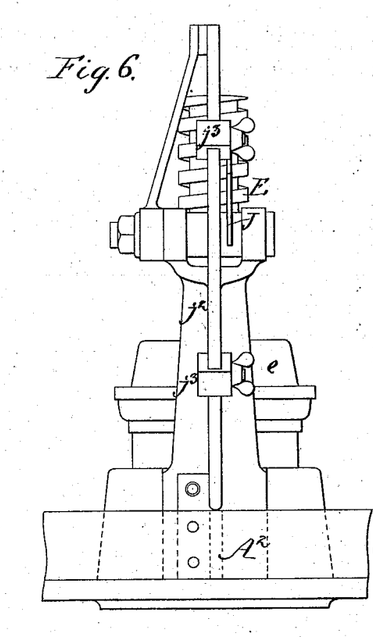
Fig. 6, an end view of the same.
Figure 7:
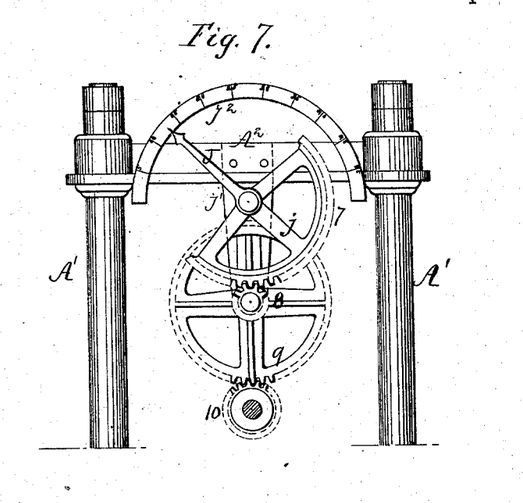
Figs. 7 and 8, views of a modification.
Figure 8:
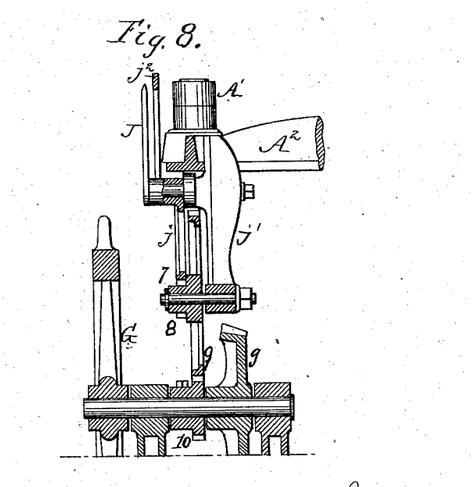

*The press.*—The frame of the press A, which is a screw-press, consists of four standards, A' A', connected together at the top by a cross-head, $A^2$, secured by nuts $a$, Fig. 3, and bolted firmly at the lower end to the foundation B', which carries the rails or tracks B, Figs. 1 and 3. The press-table $B^2$, which supports the bed of the movable carriage and the mold, and consequently receives the pressure during the pressing of the sand in the mold-box, is mounted on, but readily lifted off, vertically-adjustable brackets $b$, bolted to the inner faces of the foundation-frame B', as shown in Figs. 1 and 3. The center of the cross-head $A^2$ is provided with a bearing for the screw-nut $e$, which is adapted to turn freely in said bearing, and is screw-threaded for the reception of the threaded spindle E, carrying the platen E', as shown in Fig. 3. From the platen projects an arm or arms, $e'$, embracing one or more of the standards A', so as to guide the platen in its vertical movements and prevent it from turning. Thus, by imparting a rotary motion to the nut $e$ in one direction or the other, the platen E' will be raised or lowered. To the under side of this nut $e$ is bolted the hub of a horizontal bevel-wheel, $E^2$, into which gears a bevel-pinion, $g$, having its axis mounted in bearings in a cross-piece, $g'$, clamped to two of the standards A' A', Figs. 1 and 2, and to this axis is also keyed a hand-wheel, G, by which motion may be imparted to the wheel $E^2$, to raise or lower the platen, as will be readily understood. In connection with the platen E', I make use of a press-block, $E^3$, of a size to just fit within the press-frame or rectangular ring $h$, fitted on the top of the flask or half-mold H, which is provided on the other face with the usual cover-plate, $h'$, Figs. 1 and 3, the cover-plate and the flask being secured by bolts and keys or other suitable means to the bed I of the carriage C, (or C'.) Supposing this carriage to have been brought, with its mold filled with sand, immediately below the platen E', and the bed I to be resting on the press-table $B^2$, and the block $E^3$ to have been put in place, power is applied to the wheel G to turn the nut $e$, and so depress the spindle and platen to compress the sand in the flask H. Then the platen is raised, the block $E^3$ removed, and the bed I raised clear of the table, as hereinafter described, and the carriage, with the pressed mold, moved away. The press can be adjusted for different sizes of molds by raising the cross-head $A^2$ and the parts carried by it by means of the nuts $a$; or, where only a slight change is required, it may be obtained by changing the height of the press-table $B^2$ by a slight vertical adjustment of the supporting-brackets $b$. I prefer to combine with the press an indicator to show the extent to which the platen should be depressed after the proper degree of pressure has been ascertained on the first of a series of molds. For this purpose I mount on a bracket, $j'$, secured to the cross-head $A^2$, a pivoted pointer, J, carrying a segmental rack, $j$, gearing into the threads of the spindle E, Figs. 3, 5, and 6. Adjacent to the outer end of the pointer is a segment, $j^2$, also carried by the cross-head $A^2$, and carrying adjustable markers $j^3$, to indicate the desired extent of movement of the threaded spindle E and platen E' through the corresponding extent of movement imparted by the spindle to the pointer J. Instead of the form of indicator described, that shown in Figs. 7 and 8 may be employed. In this case a graduated segmental scale, $j^2$, is employed in connection with the pointer J, the latter being geared to the axis of the wheel G through the medium of the rack 7, pinion 8, and spur and pinion 9 10.

Figure 4:
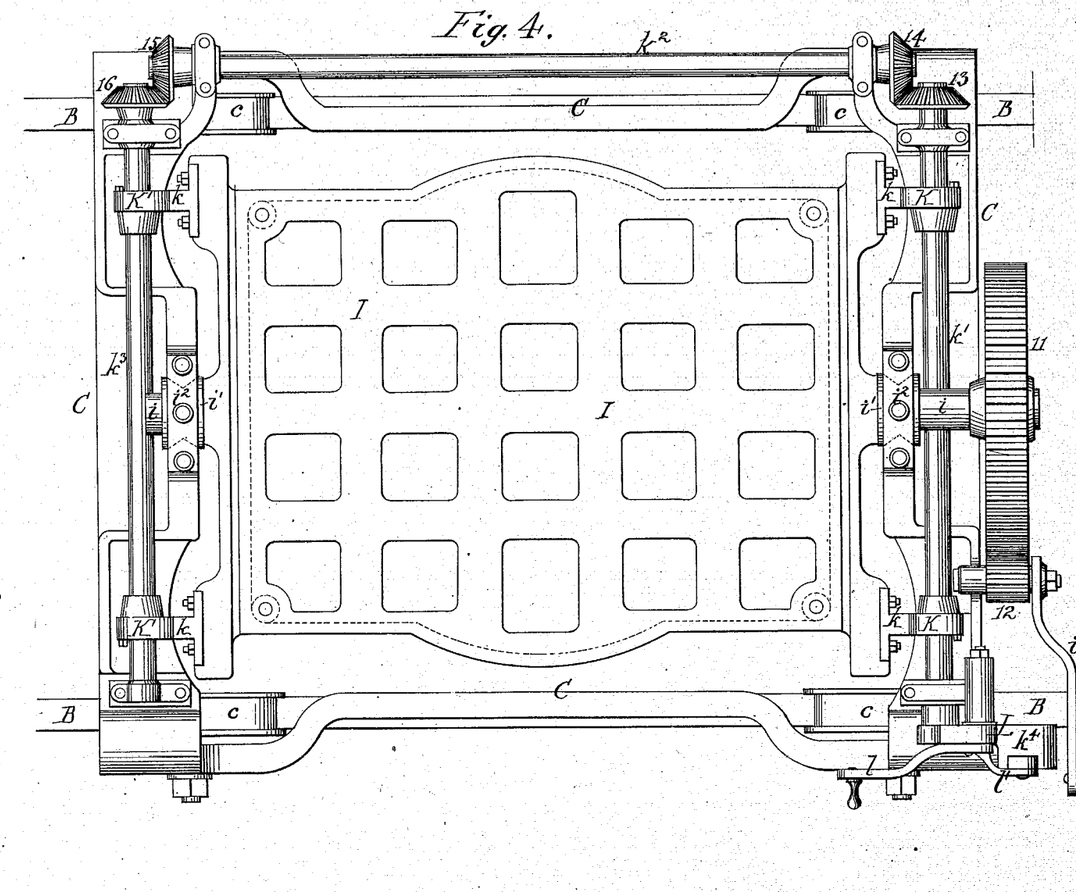
Fig. 4 is a plan view of the traveling carriage, with its reversible bed, drawn to a still larger scale.
Figures 9, 12:
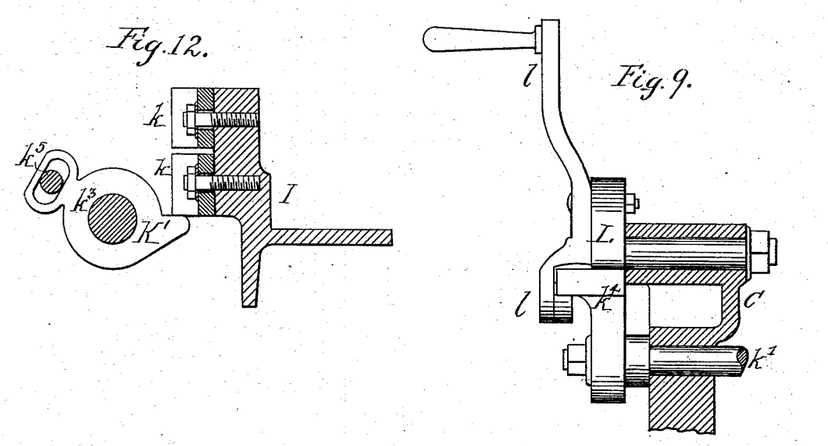
Figs. 9, 10, 11, and 12, detached views or diagrams of the devices for retaining the reversible bed of the traveling carriage in position.
Figure 10:
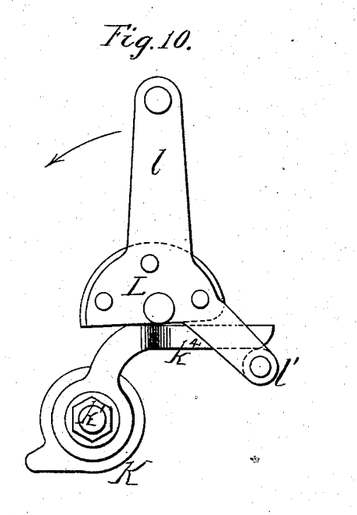
Figure 11:
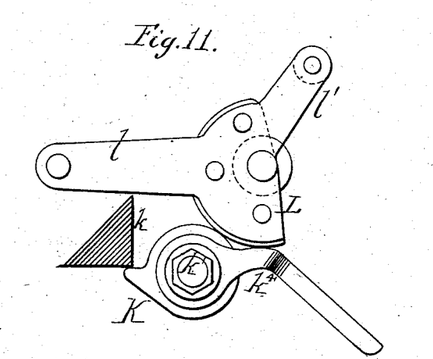
Figure 13:
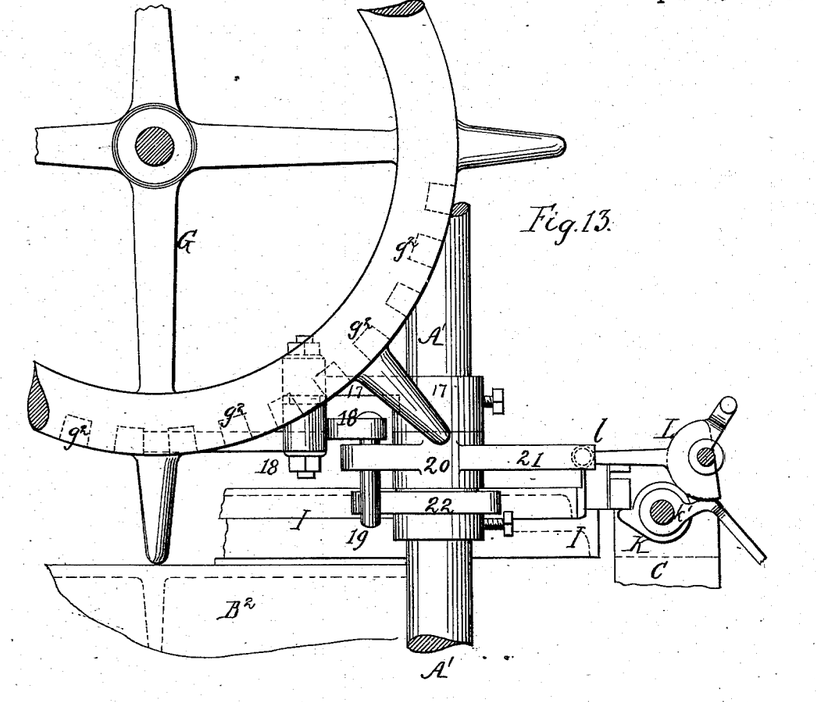
Figs. 13 and 14, side view and sectional plan, respectively, of the safety locking attachment for the press.
Figure 14:
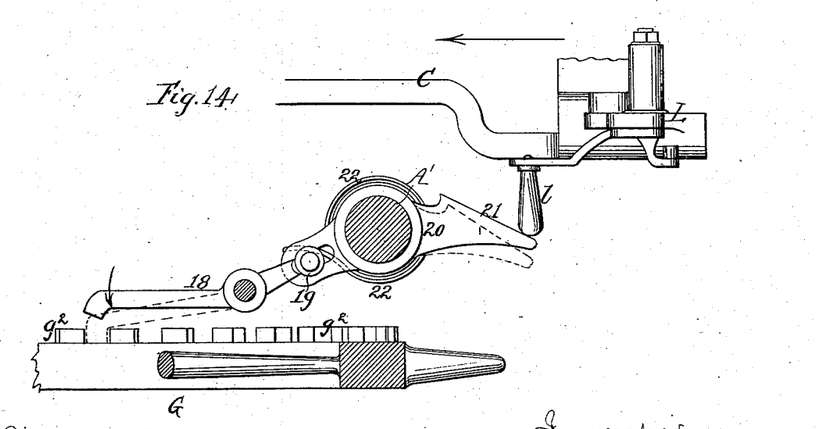

*The traveling carriages.*—As the carriages C and C' are precisely alike, a description of one will suffice for both. As shown in Figs. 1, 3, and 4, each carriage is composed of an open iron frame mounted on grooved or flanged wheels c c, adapted to travel on the rails B B. Within this open frame is a bed-plate, I, having at opposite ends central journals, $i$, Fig. 4, adapted to bearings $i'$, which are guided in V-shaped guides in the open frame. A number of holes are preferably formed in this bed-plate I, for lightness, and it is ribbed on the under side for strength. The bearings $i'$ have a limited vertical play in their guides in the frame, the extent being regulated by set-screws $i^2$, Figs. 1 and 4. On one of the journals $i$ is mounted a spur-wheel, 11, which gears into a pinion, 12, on the frame of the carriage, this pinion being provided with an operating-handle, $i^3$, by which means the bed-plate I may be turned in the bearings when released from its supporting cams or tappets K K and K' K'. These four cams or tappets are carried by two horizontal shafts, $k'$ and $k^3$, mounted in bearings in the rectangular frame of the carriage, and geared to each other (so as to be capable of being turned simultaneously) through the medium of the shaft $k^2$ and bevel-wheels 13 14 and 15 16. The cam portions of these tappets K and K' are adapted to come into contact with projections $k\ k$, which are bolted to the four corners of the reversible bed I, so as to permit of a limited adjustment on the latter, as indicated in Fig. 12. These tappets K K' are secured in positions to come into contact with the projections $k$ and support the reversible table in a perfectly horizontal position by means of a cam, L, acting on an arm, $k^4$, secured to the end of the shaft $k'$, Figs. 4, 9, 10, and 11. This cam L has a pivot mounted in bearings in the frame of the carriage, Fig. 9, and is provided with a handle, $l$, by which it may be manipulated, and with a retaining-finger, $l'$, having an anti-friction roller to catch under the end of the arm $k^4$, Fig. 11, to retain the tappets K K' clear of the projections $k$ on the reversible bed I. When this cam L is turned to the position shown in Figs. 9 and 10, the tappets K K' are clear of the bed I, and the latter is free to be turned on its pivots $i$; but when the cam L is turned by its handle $l$ to the position shown in Fig. 11 the tappets K K' are all brought into contact with the projections $k$ on the bed I, and maintain the latter in its horizontal position. When the cam L is turned from the position shown in Fig. 11 to that shown in Fig. 10, the weight of the carriage on the tappets throws the cam portions of the tappets downward and the arm $k^4$ upward, and the retaining-finger $l'$, catching under the end of this arm $k^4$, raises it farther and carries the tappets clear of the bed I. The tappets K K' are adjustable to a limited extent around their shafts $k'\ k^3$, being secured by bolts $k^5$, Fig. 12, passing through slots in the tappets, and this, with the regulation of the projections $k$, permits the adjustment of the parts relatively to each other and to compensate for wear. Instead of using the movable tappets K K' to support the bed I in a horizontal position, other devices—such as sliding bars or bolts—may be used, as will be readily understood. When the filled mold on the carriage-bed is to receive the pressure of the platen in the press A, it is necessary that the tappets K K' should be free from the load, and therefore when the carriage is run under the platen E' of the press the cam L must be turned to the position shown in Fig. 10, to free the tappets from the bed and allow the latter to rest wholly on the press-table $B^2$, as shown in Fig. 3, the vertical play of the bearings $i'$ in the frame of the carriage permitting the vertical movement of the bed I for this purpose, and also for the raising of the bed clear of the press-table by the tappets K K' when the cam L is returned to the position shown in Fig. 11. In order to insure this withdrawal of the tappets K K' clear of the bed before the platen E' is depressed onto the mold on the carriage below, I provide a safety locking device (shown in Figs. 13 and 14) in connection with the hand-wheel G. To one of the standards A' is secured an arm, 17, Fig. 13, having pivoted to it the two-armed lever 18, the long arm of which is hooked at its outer end, and adapted to take into notches or between projections $g^2$, formed on the inner face of the hand-wheel G. The short arm of this lever 18 carries a pin, 19, passing through a slot in one of the arms of a lever, 20, pivoted on the standard A', the said pin 19 also being acted on by a coiled spring, 22, to normally keep the hooked end of the lever 18 clear of the projections $g^2$. The lever 20 has an arm, 21, which projects in the path of the handle $l$ of the cam L on the carriage C when the said cam is in the position shown in Fig. 11, with the tappets K K' supporting the bed I. Hence when the carriage C is run under the press A, as indicated by the arrow, Fig. 14, with the tappets supporting the bed I, the handle $l$ will strike the arm 21 of the lever and move it against the action of the spring 22 to the position indicated by dotted lines in Fig. 14, and the hooked end of the lever 18 will interlock with the projections $g^2$ and prevent the wheel G from being turned until the handle $l$ is turned up to the position shown in Fig. 10, to clear the tappets K K' from the bed I and allow the latter to drop onto the press-table $B^2$ to receive the pressure of the platen.

Figure 15:
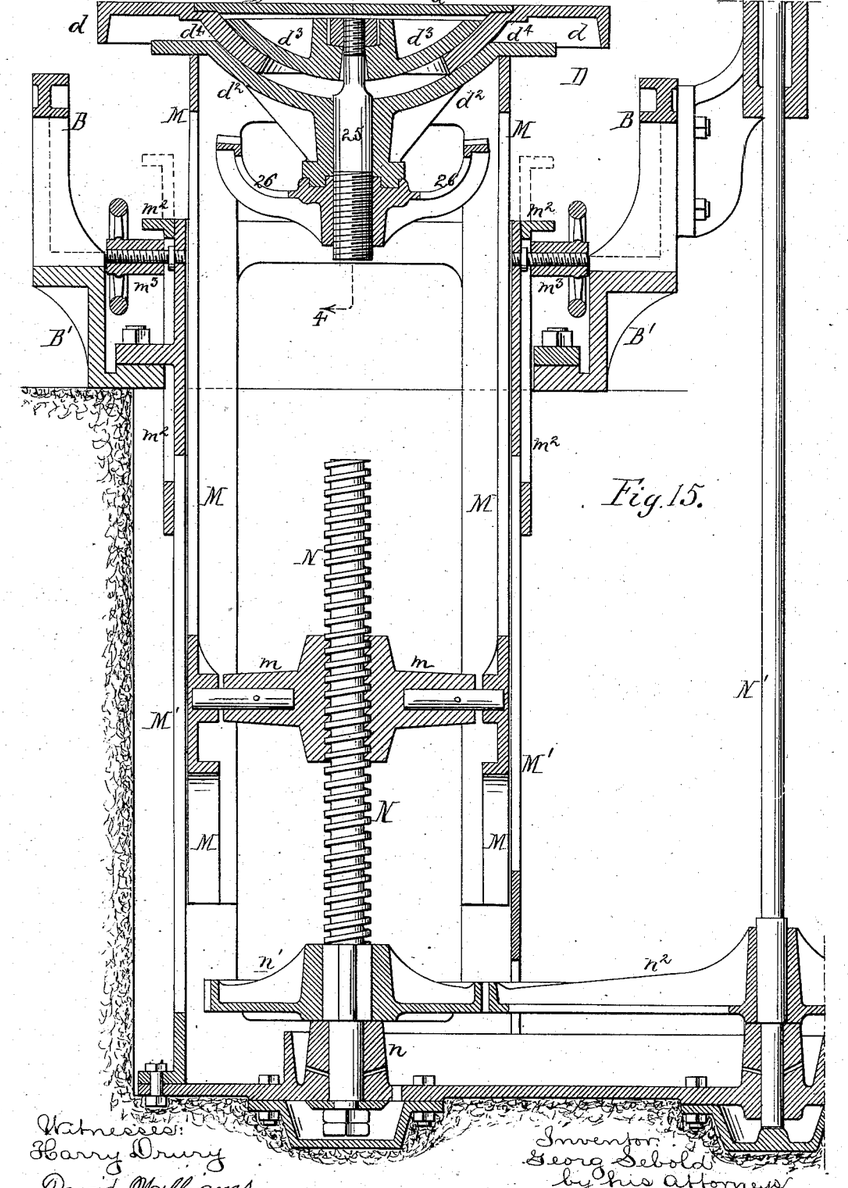
Fig. 15 is a vertical section of the device for receiving the flask when detached from the bed of the traveling carriage.
Figure 16:
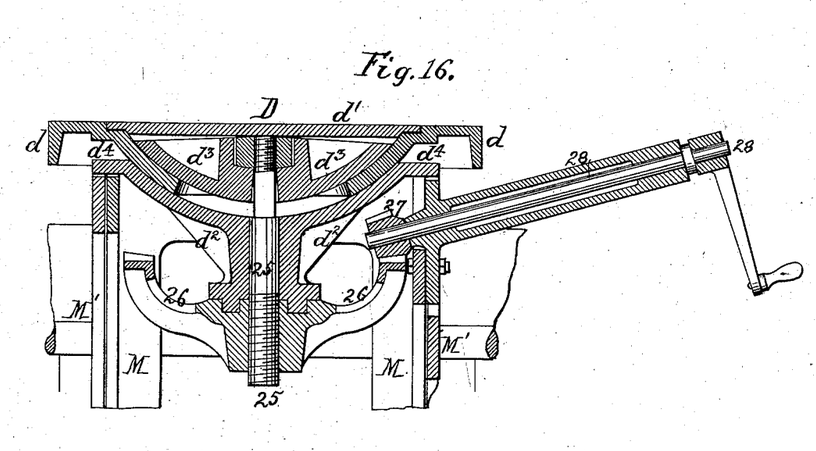
Fig. 16, a sectional view on the line 3 4, Fig. 15.
Figure 17:
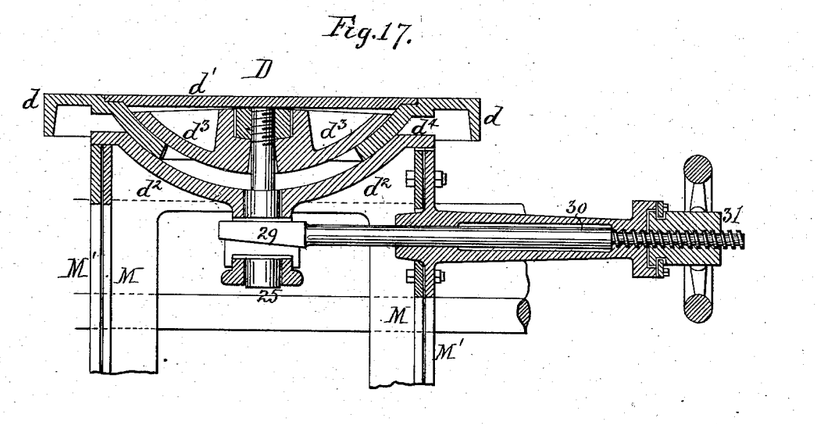
Fig. 17, a sectional view of a modification.

*The receiving-tables.*—When the sand has been properly compressed in the mold or flask by the pressure of the platen, and the carriage with its load withdrawn from the press A, it is traversed on the tracks B to a position over the receiving-table D, (or D',) and the carriage is retained there by means of a pivoted latch, 23, catching over a projection or rod, 24, on the end of the tracks, as shown at the left of Fig. 1. The tappets K K' of the carriage C are then released, as hereinabove described, and the bed I, with its pressed mold secured thereto, is reversed, so that on releasing the securing devices the mold may be deposited on the receiving-table D. This table D, as shown in Fig. 15, is mounted on a universal or ball-and-socket joint, as hereinafter set forth, and is carried by an open frame, M, which is vertically adjustable within an outer fixed frame, M', bolted to the bed B', carrying the tracks B, and also to a foundation in a pit below the level of the bed B'. The frame M is movable vertically through the medium of a screw, N, mounted in a bearing, $n$, in the foundation, and having its threaded portion passing through a threaded cross-head, $m$, carrying the frame M, as shown in Fig. 15. To the screw N is secured a pinion, $n'$, into which gears a spur-wheel, $n^2$, on a vertical shaft, N', adapted to bearings in the foundation, and also to bearings on the frame B', and provided with an operating-handle, Fig. 1, at a convenient height. Thus by turning this handle the frame M and its table D may be raised or lowered. The receiving-table D consists of the table $d$ proper, with a central circular opening closed by a flat plate, $d'$, and having a central annular cup-shaped flange, $d^4$, adapted to be clamped between two similarly cup-shaped plates, $d^2$ $d^3$, by means of a screw-bolt, 25. The upper end of this bolt has a nut adapted to a recess in the plate $d^3$, and is prevented from turning by having an angular portion passing through a corresponding opening in the plate $d^3$. The lower end of the bolt is threaded for the reception of a threaded gear-wheel, 26, by turning which the clamping-plates may be tightened or freed to secure or adjust the table $d$ to the desired level. This wheel 26 may be turned by means of a bevel-pinion, 27, Fig. 16, on the end of a handled shaft, 28, adapted to bearings secured to the frame M. Instead of clamping these plates $d^2$ $d^3$ together through the medium of the gear-wheel and pinion, a wedge, 29, Fig. 17, at the end of a rod, 30, and moved in or out by means of a handled nut, 31, adapted to the threaded end of the rod, may be used, as will be readily understood. Other forms of universal joint for the table D may be used without departing from my invention. When the carriage C has been brought immediately over the receiving-table D, and the bed of the carriage with its pressed mold reversed, as shown in Fig. 1, the frame M, carrying the table D, is raised by the screw N until it supports the mold, the clamping-plates $d^2$ $d^3$ being sufficiently free to permit the table proper, $d$, to accommodate itself to the level of the mold. Then the clamps $d^2$ $d^3$ are tightened and the devices which secure the flask to the bed I of the carriage released, so that the table D, with the mold deposited thereon, can then be lowered by the screw N until the outer edges of the plate $d^2$ of the table rest on the top of the fixed frame M'. The carriage C, having its bed turned up again, is then withdrawn, ready for the next flask. Where small flasks are used I make use of adjustable brackets $m^2$ $m^2$, which are secured to the upper edges of the frame M' by means of handled nuts $m^3$, adapted to screws secured to the frame M', and passing through vertical slots in the said brackets. These brackets $m^2$ are adjusted to a position with their tops above the top of the frame M', as indicated by dotted lines, so that the table D can rest on these brackets, should the height of the small flask not require the further lowering of the table D.

Figure 18:
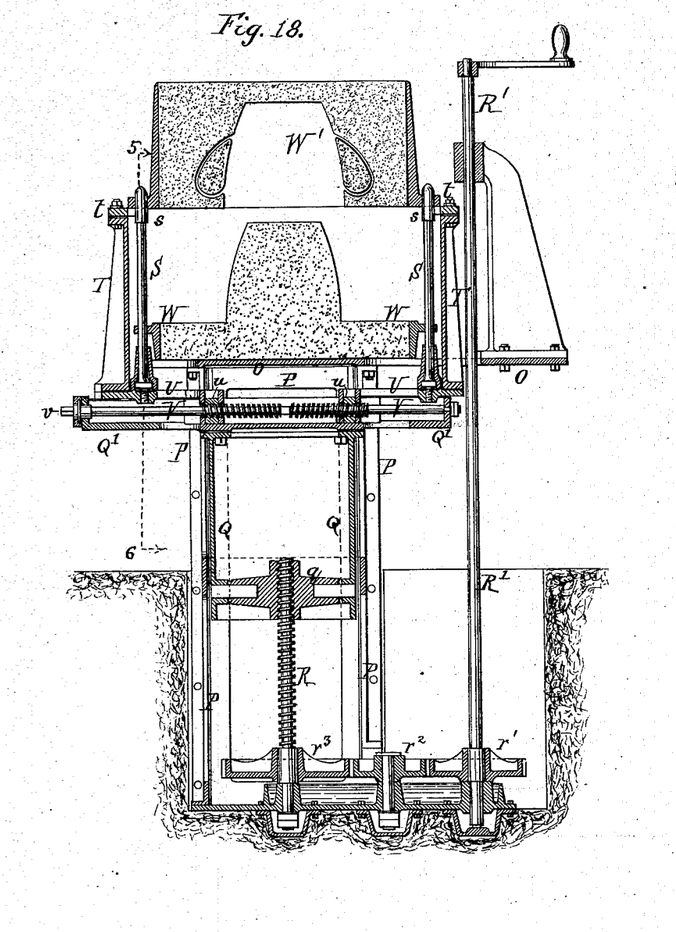
Fig. 18 is a vertical section of the apparatus for fitting together the two parts of the pressed mold or flask.
Figure 19:
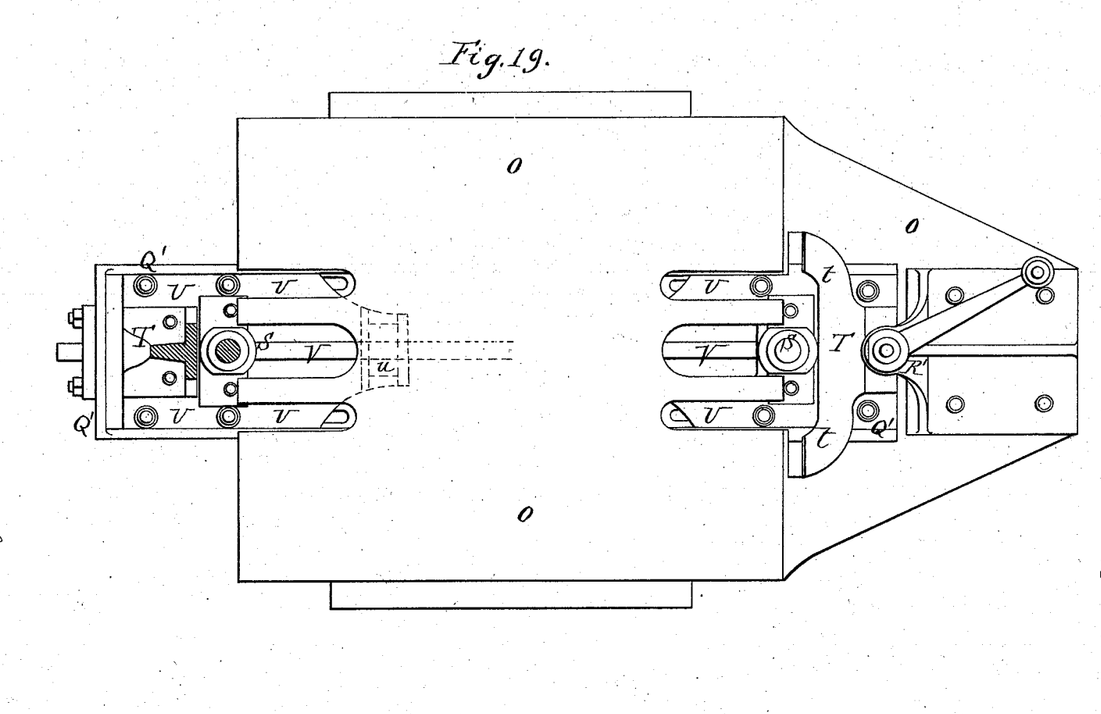
Fig. 19 is a plan view of the same, partly in section, drawn to a larger scale, and with the mold-box or flask removed.
Figure 20:
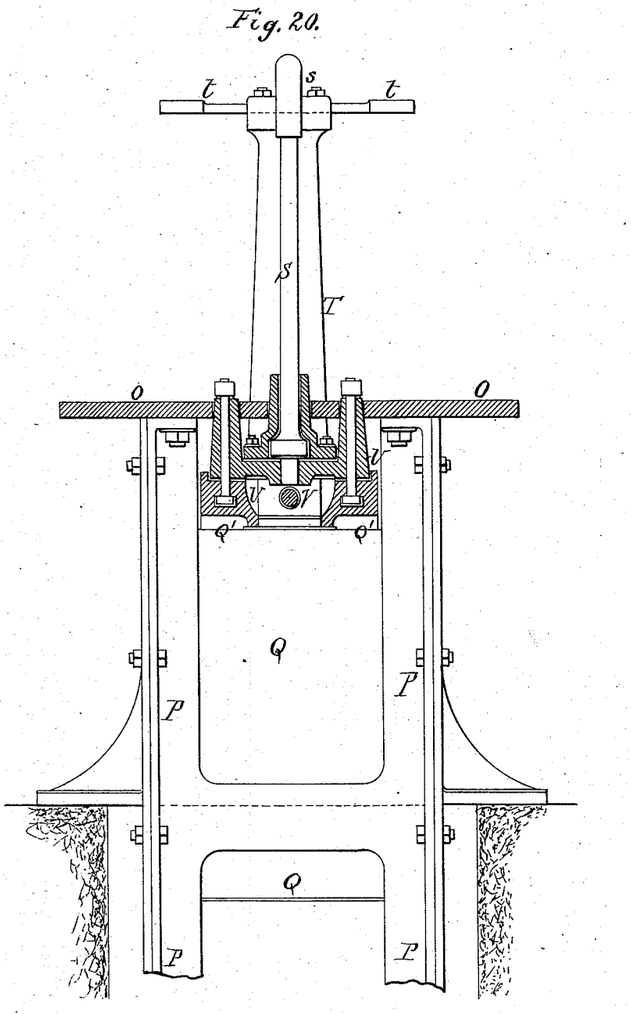
Fig. 20 is an enlarged section on the line 5 6, Fig. 18, with the two parts of the flask removed.

*Mold-fitting apparatus.*—The apparatus for accurately fitting together the two parts of the mold which have been prepared by the machinery above described is illustrated in Figs. 18, 19, and 20. P is an open fixed frame, secured to a suitable foundation, preferably below the level of the ground, and to the upper end of this frame is secured a horizontal table, O, on which is placed one part, W, of the mold. Within the fixed frame P is a vertically-guided frame, Q, which can be raised and lowered by means of a screw-shaft, R, having its bearings in the foundation-plate, and having its threaded portion adapted to the threaded cross-head $q$. Rotary motion is imparted to this screw-shaft to raise and lower the frame Q from the vertical hand crank-shaft R' through the medium of gear-wheels $r'$ $r^2$ $r^3$. To the upper end of the frame is secured the horizontal carrying-table Q', which is much narrower but longer than the fixed plate O, and which extends between the vertical standards of the fixed frame P, Fig. 20. To this table Q' are adjustably secured, as hereinafter set forth, the two vertical guide-rods S, and the two vertical standards T T, the latter being provided with cross-pieces $t$ at their upper ends, on which the second half, W', of the mold may rest, as shown in Fig. 18. The guide-rods S are provided at their upper ends with detachable guide-sockets $s$, of a size to fit the holes in the flanges of the half W' of the mold, and when the half W of the mold is to be placed on its table O, these socket-heads are removed and the perforated flanges of this flask W passed over the rods S, which thus accurately determine its position on the table O. Sockets $s$ of the proper size are then placed on the tops of these rods, and the flask W' is placed on the supports T, with the perforated flanges of the flask fitting the sockets $s$, as indicated in Fig. 18. By this means the relative positions of the two halves of the molds in vertical lines are accurately determined, and it only remains to lower the frame Q, table Q', standards T, guide-rods S, and the flask W' to accurately fit the two parts of the mold together without danger of injuring the core. When the screw R has been turned until the upper flask, W', has descended onto the lower one, W, the depression of the table Q' is continued until the guide-rods S have been entirely withdrawn from the flanges of the flasks, when the latter can be secured together by the usual means. The completed mold can then be removed ready for the casting operation, and the fitting apparatus prepared for the next pair of flasks.

In order to adapt this fitting apparatus for use on different sizes of flasks, the guide-rods S and standards T are secured to the movable table Q', so as to be adjustable horizontally toward or from each other. For this purpose the rod S and standard at each end are secured to a plate, U, guided on the table Q', so as to permit of a limited horizontal motion thereon. The inner ends of these two plates U carry nuts $u$, Figs. 18 and 19, incapable of motion independently of the plates, and to these nuts are adapted the threads of the right and left handed screw-shaft V. This screw-shaft is adapted to fixed bearings in the table Q', and has a squared end, $v$, for the reception of a winch-handle or wrench, to turn it when it is desired to adjust the guide-rods S and standards T toward or from each other for different sizes of molding-flasks.

I claim as my invention—

1. The combination of the press-frame, a press-table, and the platen with a screw carrying the platen, a nut, $e$, having a bearing in the frame, gear-wheel $E^2$, secured to the nut, hand-wheel G, and pinion gearing into the said wheel $E^2$, substantially as set forth.

2. The combination of the frame and movable platen of a press with a screw-spindle carrying the platen, toothed segment gearing into the spindle and carrying an index-finger, substantially as set forth.

3. The combination of the base-frame and standards of a press with an adjustable cross-head carrying the platen, operating wheel $E^2$, hand-wheel G, and pinion, and adjustable cross-piece carrying the latter.

4. The mold-carriage consisting of an open frame mounted on wheels, and a reversible bed mounted in bearings in said frame, and to which the flask may be secured, and devices, substantially as set forth, for supporting the bed at its four corners when it is to be maintained horizontally.

5. The mold-carriage consisting of an open frame mounted on wheels, a reversible bed mounted in bearings in the frame, shafts carrying tappets adapted to engage with the bed and geared to each other, substantially as specified.

6. The combination of the frame of the mold-carriage and a reversible bed mounted in bearings in the frame with a shaft carrying retaining-tappets, and a locking-cam to retain the shaft, substantially as described.

7. The combination of the press, having a platen, press-table, and operating-wheel, G, with a traversing carriage having a bed with movable supporting and retaining devices and an operating-handle, $l$, and with locking mechanism for the wheel, substantially as described, whereby the said wheel G is prevented from turning while the bed is held by its supporting devices.

8. The combination of the platen and operating-wheel of a press and locking-lever 18 with a traversing carriage and intermediate devices, substantially as set forth, whereby the said lever is thrown into action when the carriage is run under the platen, substantially as set forth.

9. The combination of the traversing carriage and its flask with an adjustable receiving-table having its table proper mounted on a universal joint.

10. The combination of a fixed frame, M', and a movable frame, M, carrying the table, with brackets $m^2$, adjustable vertically on said frame M'.

11. The combination of the adjustable supporting-frame and the table proper, having a curved annular flange, with correspondingly-curved clamping-plates, substantially as and for the purpose set forth.

12. An apparatus for fitting together the two parts of a mold, said apparatus consisting of a fixed table carrying one half of the mold, and a movable table carrying standards T T, to support the other half of the mold, and guide-rods S.

13. The combination of the fixed table with the movable table carrying supporting-standards T T, and guide-rods S, adjustable toward and from each other on the said movable table.

In testimony whereof I have signed my name to this specification in the presence of two subscribing witnesses.

GEORG SEBOLD.

Witnesses:
EMIL GERBER,
GUSTAV BEER.